United States Patent [19]
Balban et al.

[11] 3,967,135
[45] June 29, 1976

[54] ACCELERATION CHANGE SENSOR

[75] Inventors: Morton S. Balban; Doublas A. Larson, both of Oak Park, Mich.

[73] Assignee: Eaton Corporation, Cleveland, Ohio

[22] Filed: Apr. 11, 1974

[21] Appl. No.: 460,009

[52] U.S. Cl............................ 307/121; 250/231 R; 340/52 H
[51] Int. Cl.² ....................................... B60Q 1/00
[58] Field of Search.............. 73/517 R, 514, 71.1, 73/71.3; 250/231, 229, 232; 340/52 H, 262; 307/10 R, 121

[56] References Cited
UNITED STATES PATENTS

| | | |
|---|---|---|
| 3,591,841 | 7/1971 | Heitmann et al. ............ 250/231 R |
| 3,813,556 | 5/1974 | Beer et al. ...................... 250/231 R |

*Primary Examiner*—Herman Hohauser
*Attorney, Agent, or Firm*—Teagno & Toddy

[57] ABSTRACT

A device is provided for indicating the occurrence of rate of change of velocity of a body equal to or in excess of a predetermined value. An inertial mass is yieldably biased toward a reference position, but moves to a second position when the body is subjected to rates of change of velocity in excess of the predetermined value. A light source is provided, and when the inertial mass is in its reference position, a first light responsive means is out of light communication with the source, while a second light responsive means receives light from the light source. When the inertial mass is in its second position, the first light responsive means receives light from the light source and the second light responsive means is out of light communication with the source. Upon receipt of light, the first light responsive means produces an electric signal, but the second light responsive means no longer produces a signal. In response thereto, the signal sensor logic circuit then provides a signal to actuate an indicating circuit or the firing circuit of a device such as a vehicle occupant restraint system.

20 Claims, 7 Drawing Figures

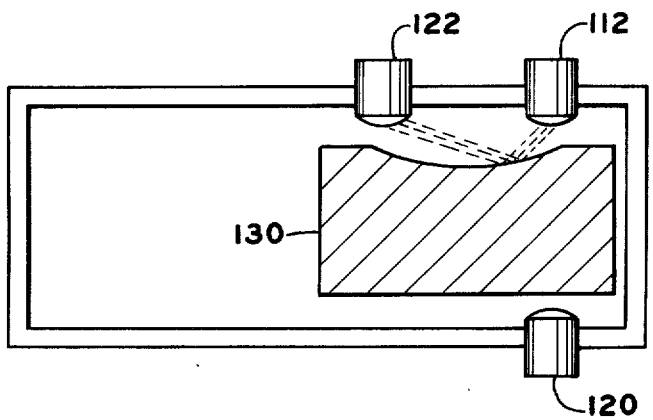
FIG. 4A  REFERENCE
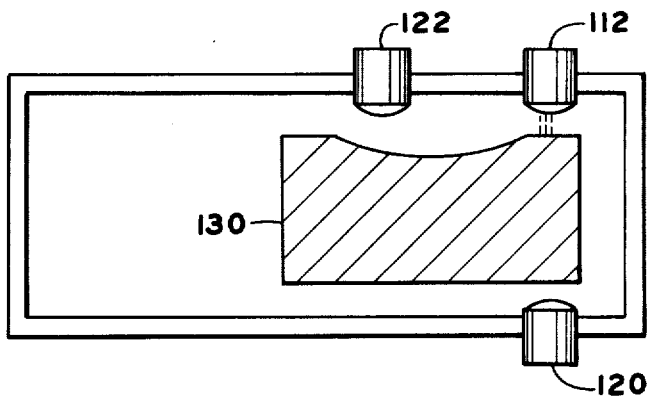
FIG. 4B  INTERMEDIATE
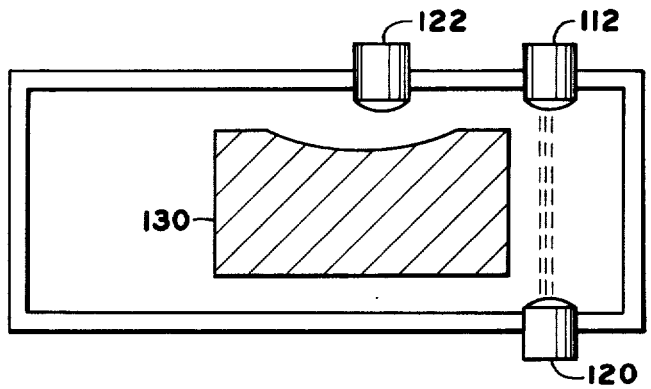
FIG. 4C  ACTUATED

ACCELERATION CHANGE SENSOR

BACKGROUND OF THE DISCLOSURE

The present invention relates to sensors, and more particularly, to sensors which are actuated by a predetermined, minimum acceleration force, or rate of change of velocity.

While the sensing device of the present invention is equally adapted for use in any type of apparatus in which it is necessary to sense acceleration forces, it is especially useful for sensing a collision and arming or actuating a vehicle occupant restraint system and will be described in connection therewith. Therefore, it should be clearly understood that the term "acceleration" is intended to mean and include both the positive and negative, i.e., both acceleration and deceleration.

Among the acceleration sensors well known in the art, the one illustrated in U.S. Pat. No. 3,154,774 is typical of those which operate on the "inclined plane" principle. An inertial member, in this case a small cylindrical battery, is positioned at the bottom of an inclined plane so that the occurrence of the predetermined acceleration force causes the member to roll up the plane, and over the top, dropping down between a pair of open contacts which are closed by the inertial member.

Another class of sensors is represented by U.S. Pat. No. 3,688,063 which employs a rollerband device (see for example the rollerband device of U.S. Pat. No. 3,452,175) to effectuate the closing of the contacts when the predetermined acceleration force occurs.

Both of the types of devices described, as well as others known in the art, ultimately require the closure of a set of mechanical contacts, and because of the high g forces to which such devices are subject, acceleration sensors using mechanical contacts are inevitably troubled by contact bounce, poor contact and high contact resistance. In addition, many of the classes of prior art sensors, especially the inclined plane sensors, operate too slowly to be useful in devices such as passenger restraint systems, wherein the operation of the system components is measured in milliseconds.

Accordingly, it is an object of the present invention to provide an acceleration sensor which overcomes the problems associated with mechanical contacts, as discussed previously.

It is a more specific object of the present invention to provide an acceleration sensor adapted for use in a vehicle passenger restraint system which may be actuated within a matter of milliseconds, by a very precisely predetermined acceleration force, to provide an output signal which is highly reproducible.

In addition to the common problems and requirements for acceleration sensors as discussed above, when such sensors are used in occupant restraint systems, it is essential that they not be easily "short circuited" to prevent actuation of the firing circuit when no crash has occurred. It is also desirable that sensors intended for use in occupant restraint systems have a built-in diagnostic capability, so that any sensor malfunctions which may occur will not remain unnoticed.

Accordingly it is another object of the present invention to provide an acceleration sensor which is capable of indicating the continuing operability and readiness of each of the sensor components.

It is also an object of the present invention to provide an acceleration sensor which is less readily susceptible to being actuated by inadvertence or vandalism.

SUMMARY OF THE INVENTION

The above and other objects of the present invention, which will become apparent upon a reading of the following detailed description, are accomplished by the provision of a device for indicating the occurrence of rates of change of velocity of a body equal to or in excess of a predetermined value. A yieldably biased inertial mass is movable from a reference position by overcoming the biasing force and moves to a second position whenever the body is subjected to rates of change of velocity equal to or greater than the predetermined value. A source of light is provided and a first light responsive means is disposed to be out of light communication with the light source when the inertial mass is in its reference position. The first light responsive means receives light from the light source when the mass is in its second position. A second light responsive means is disposed to be out of light communication with the light source when the mass is in its second position and to receive light from the light source when the mass is in the reference position. An electric circuit means is connected to the first and second light responsive means to provide an indicating signal, which may be used to arm a firing circuit, indicate a continuing ready condition or indicate a system malfunction.

BRIEF DESCRIPTION OF THE DRAWINGS

FIG. 4 is a partly schematic view, partly in cross section, of an alternative embodiment that may be employed herein.

DESCRIPTION OF THE PREFERRED EMBODIMENTS

Figure 1:
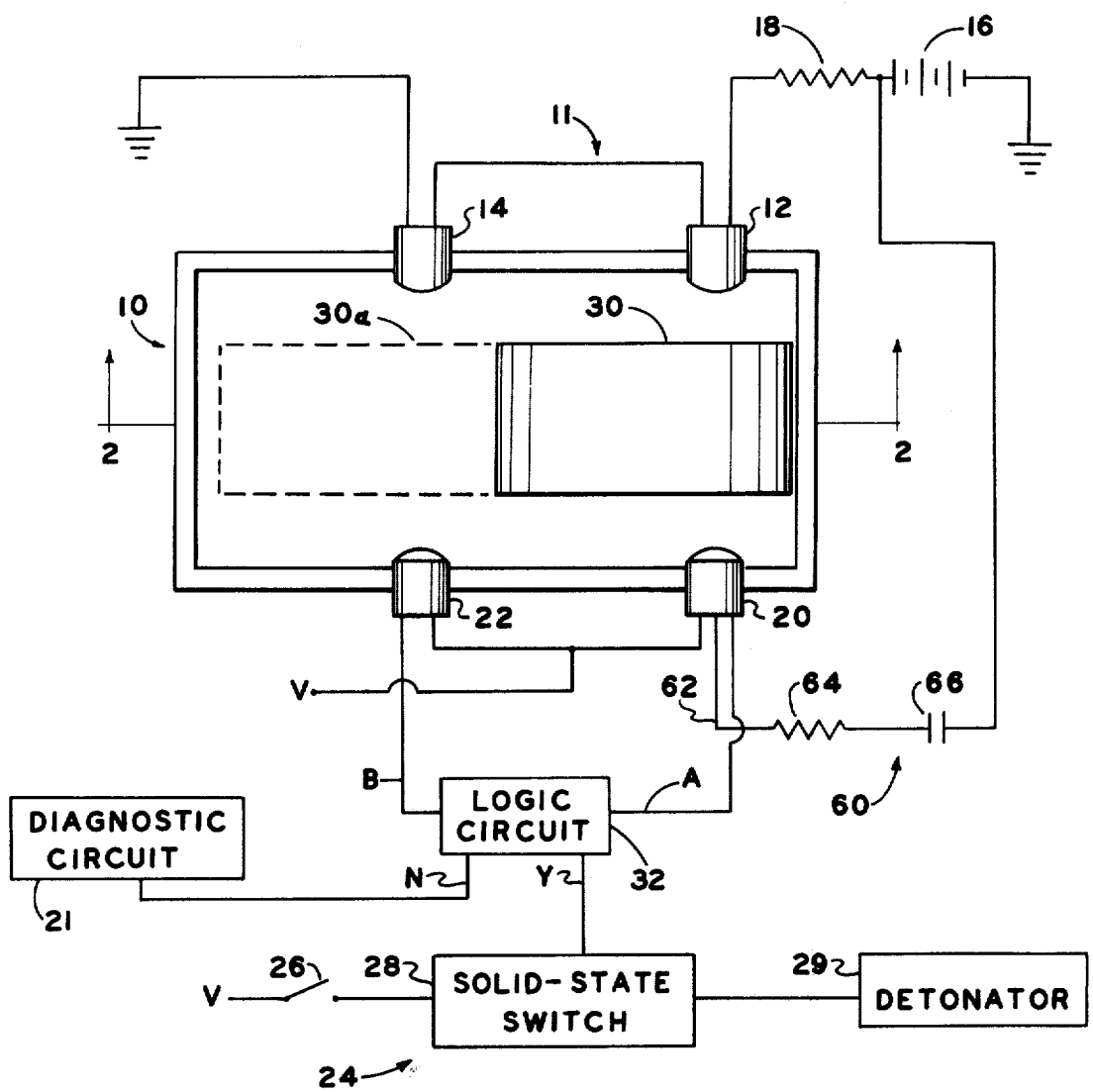
FIG. 1 is a schematic of the acceleration sensor and related circuitry in accordance with the present invention.

Referring now to the drawings which are for the purpose of illustrating a preferred embodiment of the present invention and not for limiting the same, FIG. 1 is a semi-schematic view of a typical acceleration sensor made in accordance with the teachings of the present invention. The sensor utilizes a housing 10, and has disposed therein a source of light indicated generally at 11. The source of light is preferably disposed in one wall of the housing 10 and preferably comprises a pair of spaced apart, light-emitting diodes 12,14, which are connected in series electrically. The pair of diodes 12,14 are disposed to emit light in separate, generally parallel beams and are fed by a source of power such as the battery 16. It is normally desirable to insert a currentlimiting resistor 18 into the series circuit. In the opposite wall of the housing 10 are positioned a pair of light receiving or light responsive means such as phototransistors 20,22. Although the source of light has been described as a pair of spaced, directional light-emitting diodes, it will be apparent that other arrangements of the light sources and/or emitters may be employed in the present invention. For example, a single bi-directional source of light may be disposed between a pair of mirrors which are angled such that light from the sources is directed (emitted) into spaced apart, parallel beams. With such a mirrored arrangement, separate spaced light sources are not required.

In series with the phototransistors 20,22 is a logic circuit, generally designated 32, and a firing circuit, generally designated 24, typically including a forward (or high g) crash sensor 26, a solid state switch 28, which may be a transistor or a silicon-controlled rectifier, and a detonator 29. The operation of these circuits will be described subsequently.

A light blocking inertial mass 30 is shown in its normal or reference position between the diode 12 and the phototransistor 20, while it is shown in its second position, or actuated position at 30a. It should be understood that it is necessary to bias the inertial mass 30 to its reference position with a sufficient force that it will move to the actuated position only when the sensor is subjected to a rate of change of velocity equal to or in excess of the predetermined value. For simplicity of illustration, the biasing means has been omitted in FIG. 1.

Figure 2:
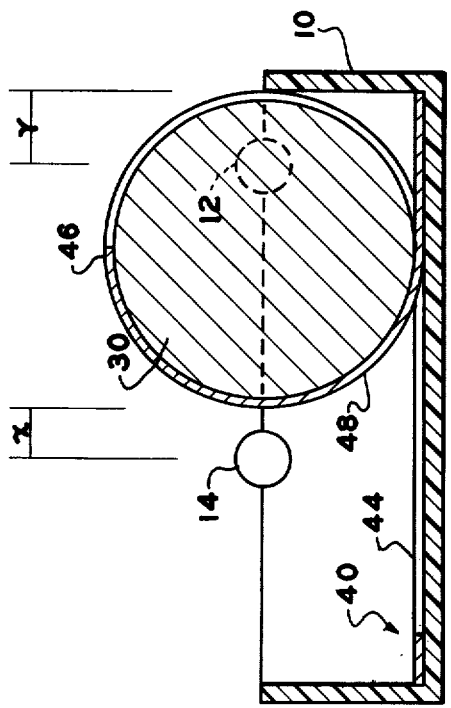
FIG. 2 is a cross-sectional view taken on line 2—2 of FIG. 1.
Figure 3:
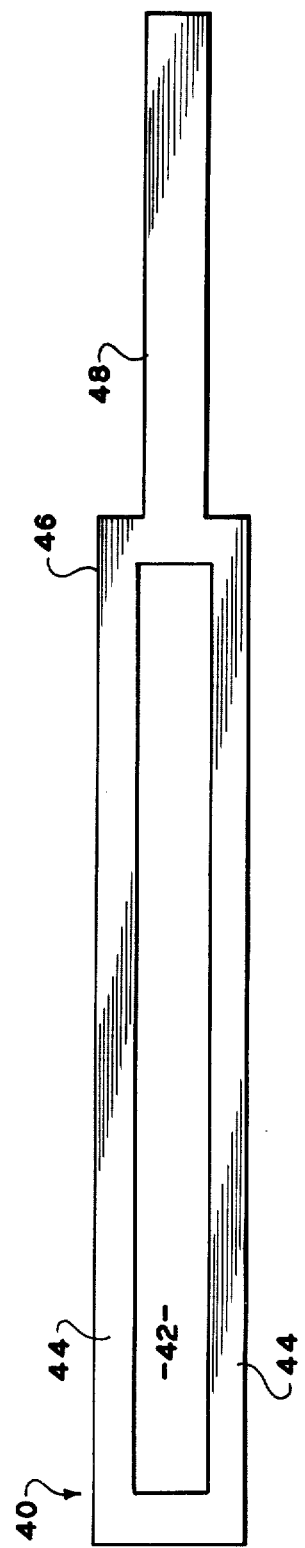
FIG. 3 is a plan view of the preferred biasing band used in the present invention.

FIG. 2 is a cross-sectional view taken through the sensor on line 2—2 of FIG. 1 but with the biasing means included. As is shown in FIG. 3, the biasing means preferably comprises a band 40 having elongated slot 42 formed therein and defined by a pair of elongated side portions 44. The slot 42 terminates adjacent the transition portion 46 from which extends the narrower tongue portion 48. In the preferred form of the band 40, shown in FIG. 3, the slot 42, side portions 44 and tongue 48 each have constant widths, progressively along the length of the band. Referring again to FIG. 2, with the inertial mass 30 in its reference position, the band 40 is disposed with the side portions 44 extending from the left end of the housing 10, along the bottom thereof, and passing under and around the right half of the mass 30. The transition portion 46 is then on top of the mass 30 and the tongue portion 48 extends around the left half of the mass 30, under the mass, and to the right end of the housing 10, passing through the elongated slot 42.

The band 40 biases the mass toward its reference position, toward the right in FIG. 2, because in the subject embodiment, the band portions 44 as well as the tongue portion 48 tend to straighten out. More force is exerted by the side portions 44 tending to straighten out than by the tongue portion 48, thus pulling or biasing the mass 30 to the right, because the total width of the portions 44 is greater than the width of tongue 48, as is understood in the rollerband art. It will be noted that because the side portions 44 and tongue 48 have constant widths, the biasing force of the band is constant during rolling movement of the mass 30. However, it will be understood that many different configurations for the band 40 other than those shown in FIG. 3 may be used to accomplish the purpose of biasing the light-blocking inertial mass 30 to its reference position. It should also be noted that, within the scope of the present invention, means other than a rollerband may be used to bias the mass, but the rollerband is preferred because of its speed of actuation and minimal friction loss. As an example of the way in which the configuration of band 40 may be varied to change its biasing characteristics, the biasing force may be varied by tapering the tongue portion 48 and/or tapering slot 42. The biasing force may thereby be made to vary accordingly, in a manner well known in the art of rollerband devices.

The operation of the acceleration sensor of the present invention can best be understood by referring again to FIG. 1. It should first be noted that in the embodiment shown schematically in FIG. 1, the device is employed as a "low-$g$" sensor used to arm a firing circuit 24 in response to an acceleration (deceleration) in the range of about 0.8$g$ to about 1.0 $g$. The critical or high level acceleration of the collision, normally somewhere in the range of about 7.0 $g$ is sensed by the high level sensor or forward sensor 26. When both the low-$g$ sensor and forward sensor 26 have been actuated, the firing circuit is then operable. It should be apparent, however, that the type of sensor described herein may be used as the forward sensor also, and is thus not limited to sensing "low-$g$" accelerations.

Because the light-emitting diodes 12,14 are connected in series, both are continually giving off light. When the light blocking, inertial mass 30 is biased to its normal reference position, no light is received by phototransistor 20, but light is received by the phototransistor 22, and in response thereto, the logic circuit 32 provides an output signal to the diagnostic circuit 21. As is well known in the art, only the presence of a signal is necessary for operation of the diagnostic circuit and the exact voltage or current values are generally not important. When an acceleration equal to or greater than that for which the sensor was designed occurs, the biasing force of the band 40 is overcome and the mass 30 quickly "rolls" to the left, to the position shown in phantom outline by 30a in FIG. 1. In the position 30a, the inertial mass 30 blocks phototransistor 22 from light communication with diode 14 and terminates this signal to the logic circuit, while permitting light communication between the diode 12 and phototransistor 20, which provides a signal to the logic circuit 32. Under these conditions, the logic circuit 32 provides the arming signal to the firing circuit 24 or to any other type of circuit or indicating device desired. It will be apparent to those skilled in the art that, although the invention has been described as utilizing light-emitting diodes and phototransistors, other light sources and light receiving or light responsive means may be used within the scope of the invention. The invention is also not limited to utilization of light having wave-lengths within the visible spectrum, but may employ other wave-lengths as for example, infra-red or ultraviolet light.

In FIG. 2 it is shown that the inertial mass 30 must move a distance $y$ from its reference or normal position before there is light communication between diode 12 and phototransistor 20. Similarly, the mass 30 must move a distance $x$ from the reference position before it blocks light from diode 14 to phototransistor 22. Within the scope of the invention, the distance $x$ may be greater than or less than the distance $y$, but preferably, they are approximately equal so that light is first received by phototransistor 20 just as light is blocked from phototransistor 22. In one particular configuration of the preferred embodiment, the inertial mass 30 has a diameter of about 0.375 inch, distance $y$ is about 0.16 in., distance $x$ is about 0.10 inch, and the band 40 is about 2.3 in. long.

As mentioned previously, the receipt of light from diode 14 by phototransistor 22, when the mass 30 is in its reference position, results in a signal from the logic circuit to the diagnostic circuit. Because of the arrangement of the sensor elements, the presence of the signal to the diagnostic circuit is a built-in fail-safe function which indicates the following:
1. that both diodes 12 and 14 are emitting light;
2. that both phototransistors 20 and 22 are powered and are operational;
3. that the mass 30 is properly biased to its reference position; and
4. the occurrence of (1) and (2) above insure that if an excessive acceleration occurs, the sensor can provide the necessary output signal.

LOGIC CIRCUIT

Figure 5:
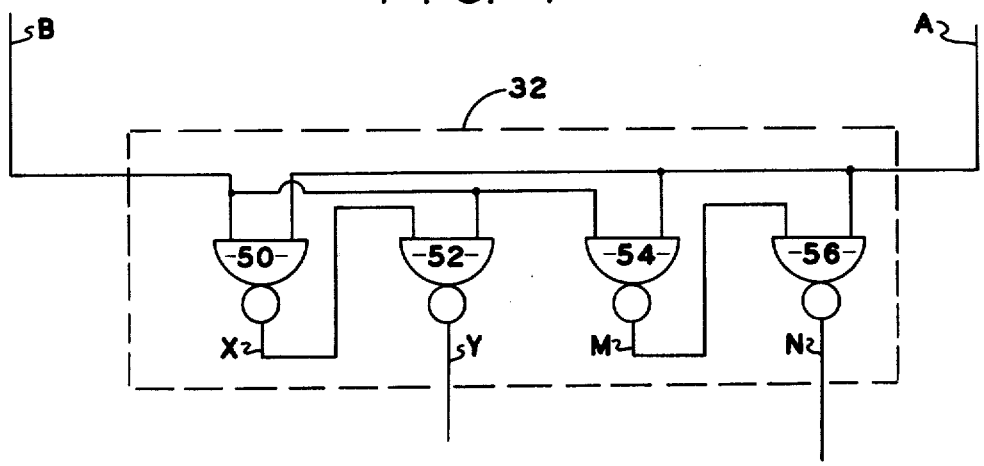
FIG. 5 is a schematic illustration of a logic circuit which may be utilized with the sensor of the present invention.

FIG. 5 illustrates schematically the logic circuit 32 of the subject embodiment which insures that an arming signal is delivered to the firing circuit 24 only when phototransistor 20 is receiving light and phototransistor 22 is not receiving light. In FIG. 5 the output signal from phototransistor 20 is designated A and the output signal from phototransistor 22 is designated B. The logic circuit used herein comprises a series on NAND gates 50, 52, 54 and 56, with the output signals from the gates being designated, respectively, X, Y, M and N. Output signal Y from gate 52 is the input to the firing circuit 24, while output signal N from gate 56 is the input to the diagnostic circuit 21. In the accompanying "truth" or logic tables, a "high" voltage is represented by the numeral 1, while a "low" or zero voltage is represented by the numeral 0.

Table I represents the logical combination of NAND gates 50 and 52 which are arranged to provide a high voltage arming signal (logical 1) to firing circuit 24 only when signal A is a logical 1 and signal B is a logical 0. It should be noted that the input to gate 50 comprises signals A and B, and the input to gate 52 comprises signals X and B.

TABLE I

| A | B | X | Y |
|---|---|---|---|
| 1 | 0 | 0 | 1 |
| 1 | 1 | 0 | 0 |
| 0 | 1 | 0 | 0 |
| 0 | 0 | 1 | 0 |

Table II represents the logical combination of NAND gates 54 and 56 which are arranged to provide a high voltage signal (logical 1) to diagnostic circuit 21 only when signal A is a logical 0 and signal B is a logical 1. The input to gate 54 comprises signals A and B, and the input to gate 56 comprises signals M and A.

TABLE II

| A | B | M | N |
|---|---|---|---|
| 0 | 1 | 0 | 1 |
| 1 | 1 | 0 | 0 |
| 1 | 0 | 0 | 0 |
| 0 | 0 | 1 | 0 |

In order to verify that light responsive means 20 is in proper operating condition, a test circuit 60 is included which provides a temporary voltage to the base of phototransistor 20 through line 62. The test circuit 60 includes a resistor 64 and a capacitor 66 and the duration of the temporary voltage is a function of the RC time constant of the combination of resistor 64 and capacitor 66, each time the sensor circuit is initially energized, such as by closing the vehicle ignition switch. The signal to phototransistor 20 causes output signal A to be a high voltage, which, as explained in the description of the logic circuit, results in a low voltage signal to the diagnostic circuit, resulting in a "fault" signal, which, in reality, merely indicates that phototransistor 20 is operative. At the end of the period determined by the RC time constant, circuit conditions achieve a "steady-state", and the fault signal ceases.

FIG. 4 illustrates an alternative embodiment of the present invention in which only one light-emitting diode 112 is used. With an inertial mass 130 in its reference position as shown in FIG. 4(A), a phototransistor 120 is out of light communication with diode 112. The inertial mass 130 is substantially the same as the mass 30 in FIGS. 1 through 3, and may be biased in the same manner, but mass 130 has a reflective surface 132 provided on the side adjacent diode 112, so that when it is in its reference position, light is received from diode 112 by a light receiving means, preferably a phototransistor 122. A signal is then provided to a logic circuit by phototransistor 122, and then to a diagnostic circuit in the same manner and for the same purposes as was discussed previously with respect to phototransistor 22 in FIGS. 1 through 3. In the embodiment of FIG. 4 when the mass 130 moves to a position intermediate the reference and the actuated positions, as shown in FIG 4(B), the reflective surface 132 is no longer in a position with respect to diode 112 to reflect light therefrom to phototransistor 122, and at this point, light is not received by either phototransistor. When the mass 130 has rolled to the actuated position shown in FIG. 4(C), phototransistor 120 is in light communication with diode 112, with phototransistor 122 remaining out of light communication. Phototransistor 120 thereby provides an output signal in the same manner and for the same purpose as was described for phototransistor 20 in FIGS. 1 through 3.

The invention has been described in detail sufficient to enable one of ordinary skill in the art to make and use the same. Obviously, modifications and alterations of the preferred embodiments will occur to others upon a reading and understanding of the specification and it is our intention to include all such modifications and alterations as part of our invention insofar as they come within the scope of the appended claims.

We claim:
1. A device for indicating the occurrence of rates of change of velocity of a body, equal to and greater than a predetermined minimum, comprising:
   a. a base fixed to the body;
   b. an inertial mass movable with respect to said base and having a reference position, and means biasing said mass to said reference position, said mass being movable to overcome the biasing force and move to a second position when the body is subjected to rates of change of velocity equal to and greater than the predetermined minimum;
   c. a light source attached to said base;
   d. a first light responsive means attached to said base and disposed to be out of light communication with said light source when said mass is in said reference position and to receive light from said light source when said mass is in said second position;
   e. a second light responsive means attached to said base disposed to be out of light communication with said light source when said mass is in said second position and to receive light from said light source when said mass is in said reference position; and f. electric circuit means connected to said first and second light responsive means operative to indicate the status of both said first and second light responsive means.

2. The device defined in claim 1 wherein said means biasing said inertial mass includes a band of resilient metal wrapped about the periphery of said mass.

3. The device defined in claim 1 wherein:
  a. said mass has a generally cylindrical configuration; and
  b. said biasing means includes a flexible, resilient band having one end anchored to said base and passing around at least a portion of said mass.

4. The device defined in claim 3 wherein said band passes around substantially the entire periphery of said mass and has the opposite end anchored to said base.

5. The device defined in claim 4 wherein said band includes an elongated slot formed therein adjacent said one end and an elongated tongue formed therein adjacent said opposite end, said tongue having a width less than the width of said slot and less than the difference between the width of said band and the width of said slot.

6. The device defined in claim 1 wherein said biasing means prevents said mass from moving to said second position at rates of change of velocity less than about 1.0 g.

7. The device defined in claim 1 wherein:
  a. a first light source is in light communication with said first light responsive means when said mass is in said second position; and
  b. a second light source is in light communication with said second light responsive means when said mass is in said reference position.

8. The device defined in claim 7 wherein said first and second light responsive means provide a diagnostic electric signal, when said mass is in said reference position, to indicate that said first light source and said first light responsive means are operable.

9. The device defined in claim 1 wherein said light source includes a plurality of spaced directional light emitters.

10. The device defined in claim 9 wherein said light emitters comprise a pair of spaced light-emitting diodes and said first and second light responsive means comprise phototransistors.

11. The device of claim 1 wherein said electric circuit means includes logic means having:
  a. means for providing a first predetermined output signal only when said first light responsive means is receiving light and said second light responsive means is out of light communication with said light source; and
  b. means for providing a second predetermined output signal only when said second light responsive means is receiving light and said first light responsive means is out of light communication with said light source.

12. A collision sensor for providing a first output signal to a firing circuit and a second output signal to a diagnostic circuit of a vehicle occupant restraint system, comprising:
  a. a housing;
  b. first and second light emitters disposed within said housing;
  c. first and second light responsive means connected electrically, said first light responsive means being disposed to receive light from said first light emitter and said second light responsive means being disposed to receive light from said second light emitter;
  d. an inertial member having a normal position preventing light communication between said first light emitter and said first light responsive means and actuating position preventing light communication between said second light emitter and said second light responsive means;
  e. a flexible band having a first end anchored adjacent said first light emitter and a second end anchored adjacent said second light emitter, said band passing around substantially the entire periphery of said inertial member, maintaining said member in said normal position at vehicle accelerations less than a predetermined acceleration force; and
  f. logic means connected electrically to said first and second light responsive means operable to indicate the status of both said first and second light responsive means.

13. The sensor of claim 12 wherein said logic means includes:
  a. means for providing said first output signal only when said first light responsive means is receiving light and said second light responsive means is out of light communication with said second light emitter; and
  b. means for providing said second output signal only when said second light responsive means is receiving light and said first light responsive means is out of light communication with said first light emitter.

14. The sensor of claim 12 wherein said first and second light emitters comprise light-emitting diodes and said first and second light responsive means comprise phototransistors.

15. The sensor of claim 12 wherein said inertial member has a cylindrical configuration and is oriented for rolling movement in a direction generally perpendicular to the path of light received by said first light responsive means.

16. A vehicle collision sensor for providing a signal to a firing circuit of an occupant restraint system when the vehicl is subjected to accelerations greater than a predetermined minimum comprising:
  a. a light source;
  b. a first light responsive means positioned for light communication with said light source;
  c. an inertial mass including light directing means having a first position between said light source and said first light responsive means to prevent light communication therebetween when the vehicle is subjected to less than the predetermined acceleration force;
  d. means yieldably urging said inertial mass to said first position of said light directing means; and
  e. a second light responsive means adjacent said light source, said light directing means including means operable to direct light from said light source to said second light responsive means when said light directing means is in said first position, such that when the vehicle is subjected to at least the predetermined acceleration force, said light directing means moves from said first position to a second position and light is permitted to pass from said light source to said first light responsive means.

17. The device defined in claim 16 wherein said light directing means includes a light reflecting surface thereon.

18. The sensor defined in claim 16 wherein said light source, said first light responsive means and said second light responsive means are disposed such that the movement of said light directing means to a position intermediate said first and second positions prevents light communication between said light source and said first light responsive means, and prevents direction of light from said light source to said second light responsive means.

19. The sensor defined in claim 17 wherein said light directing member is generally cylindrical and said light reflecting surface comprises and indented surface in the circular end wall of said member.

20. The sensor defined in claim 19 wherein said indented surface has a generally concave configuration.

* * * * *